March 5, 1968 F. J. FARINA, JR 3,371,648
LIQUID INDICATOR
Filed March 24, 1966
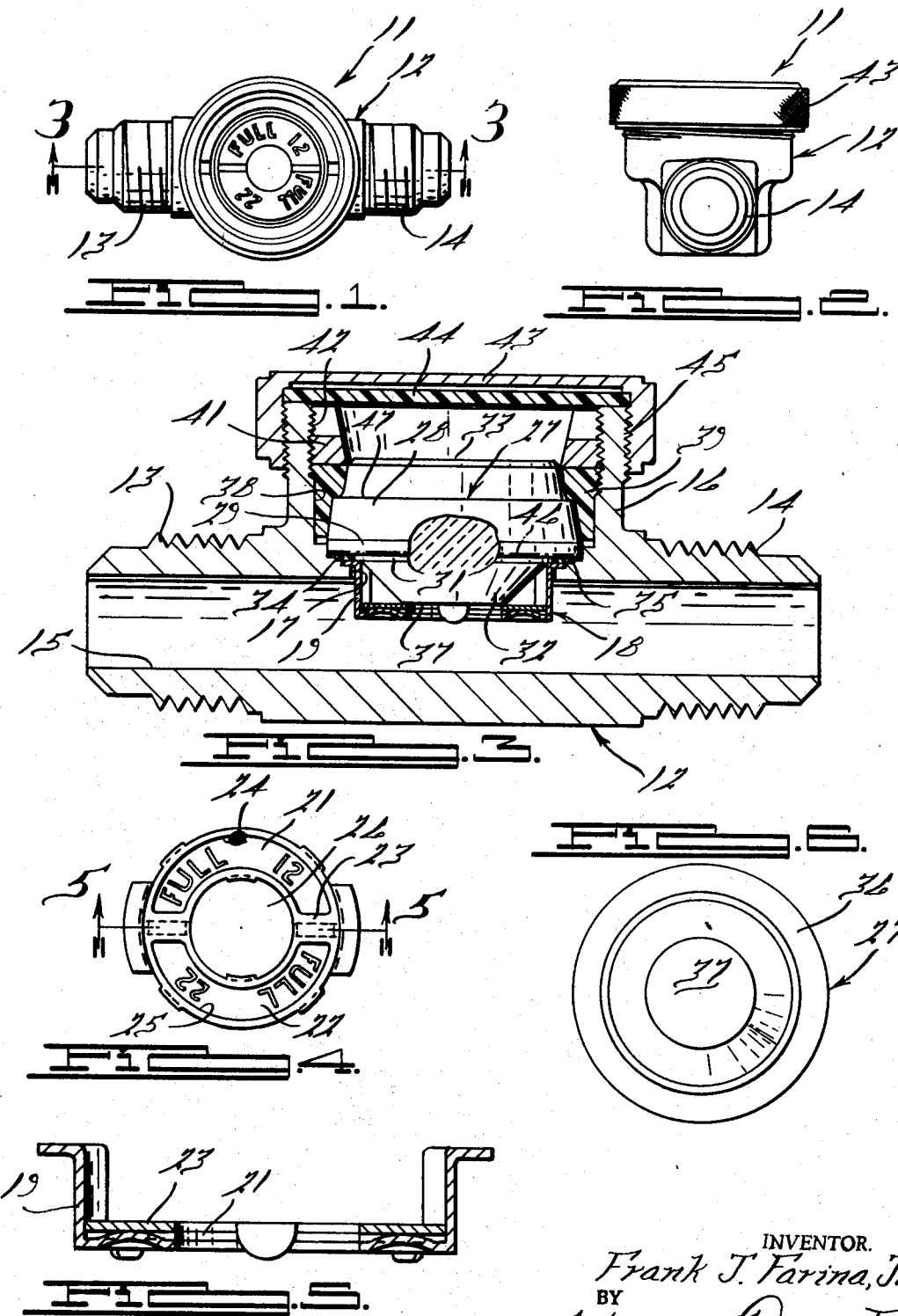
INVENTOR.
Frank J. Farina, Jr.
BY
Barnes, Dickey & Pierce
ATTORNEYS

United States Patent Office 3,371,648
Patented Mar. 5, 1968

3,371,648
LIQUID INDICATOR
Frank J. Farina, Jr., Port Huron, Mich., assignor to Mueller Brass Co., Port Huron, Mich., a corporation of Michigan
Filed Mar. 24, 1966, Ser. No. 537,182
5 Claims. (Cl. 116—117)

ABSTRACT OF THE DISCLOSURE

A liquid indicator for refrigerant lines to indicate the absence of liquid and whether there is water present. The indicator has a sight glass with a slightly conical sealing portion and a frustoconical sight portion coacting with an annular indicator.

---

This invention relates to liquid indicators, and more particularly to units insertable in refrigerant or other liquid lines which are used to indicate whether the line is full of liquid and, in the case of a refrigerant line, to possibly indicate further whether there is water present in the system.

It is an object of the invention to provide a novel and improved liquid indicator of this type in which the sight glass can be inexpensively made while still providing a wide seal area around the sight glass which can engage the packing in a manner enhancing the sealing effect.

It is another object to provide an improved liquid indicator of this nature in which the sight glass can be easily molded.

It is a further object of the invention to provide a novel liquid indicator having these characteristics, in which the sight glass will permit vision of a legend or colored indicating material over a relatively wide area, and in which a center area will be present through which fluid flow can be perceived at all times, regardless of whether the liquid fills the line or not.

Other objects, features and advantages of the present invention will become apparent from the subsequent description and the appended claims taken in conjunction with the accompanying drawing, in which:

FIGURE 1 is a top plan view of a suitable embodiment of the liquid indicator;

FIGURE 2 is an end elevational view thereof;

FIGURE 3 is an enlarged cross-sectional view in elevation taken along the line 3—3 of FIGURE 1;

FIGURE 4 is a top plan veiw of the indicator clip subassembly;

FIGURE 5 is an enlarged cross-sectional view in elevation of this subassembly taken along the line 5—5 of FIGURE 4, and FIGURE 6 is a bottom plan view of the sight glass.

Briefly, the illustrated embodiment of the invention comprises an elongated tubular body inside of which is mounted a sight glass. This glass comprises a molded member having an upper mounting portion and a lower sight portion. The mounting portion has a relatively shallow upward taper and is adapted to interfit with an annular seal so that tightening of the assembly will wedge the seal outwardly against the surrounding portion of the body. The sight portion is of frustoconical shape and is downwardly tapered, more sharply than the mounting portion. It extends paritally into the main fluid passage, and an indicator clip subassembly is mounted next to it, so that when the liquid line is full a legend or other indicia may be read on the indicator clip through the frustoconical surface. The bottom of the sight glass, centrally of the frustoconical surface, is flat so that liquid can be seen at all times through this area. In molding the sight glass, the parting line will be located between the two tapered surfaces.

Referring more particularly to the drawing, the liquid indicator is indicated generally at 11 and comprises a body generally indicated at 12 which is of elongated and generally tubular shape, having a threaded inlet 13 and a threaded outlet 14 in aligned relation. A bore 15 extends through body 12.

The sight glass portion 16 of body 12 extends upwardly therefrom between portions 13 and 14. This extension is of generally cylindrical shape, with a lateral opening 17 leading to it from bore 15. An indicator clip subassembly generally indicated at 18 is mounted in opening 17 and extends partially into passage 15. This subassembly comprises an annular saddle 19 resting on a shoulder immediately above opening 17 and extending therethrough, first and second moisture indicator papers 21 and 22 resting on saddle 19, and a retainer 23 holding the papers in position. The retainer is provided with arcuate openings 24 and 25 through which the papers may be seen. Each paper may be provided with a legend such as the word "FULL" cut therethrough, followed by a designation of a type of refrigerant. These papers are of known type, and will turn different colors when dampened by water in the refrigerant with which it is intended to react. For example, paper 21 may turn pale bluish-pink when subjected to moisture in refrigerant 12, and it will carry the legend "12." The paper 22 will turn rosy-pink when dampened by water in refrigerant 22, and will carry the legend "22." The circular space 26 at the center of assembly 18 will permit the viewer to see liquid through this subassembly, this viewing being through the sight glass as later described.

The sight glass is provided above subassembly 18, this sight glass being generally indicated at 27. The sight glass is of circular shape and is preferably fabricated of molded glass which is properly tempered or annealed. Sight glass 27 has four basic sections, a sealing section 28, mounting section 29, a seal spacer section 31 and a sight section 32.

Seal section 28 is of slightly tapered shape in an upward direction, with an intermediate ledge, and is surmounted by a flat top 33. Mounting section 29 is of cylindrical shape and has a shoulder underneath it which is engageable with an annular seal 34 which rests on a shoulder 35 immediately above the top of subassembly 18. Gasket 34 engages an annular flat surface 36 (FIGURE 6) on the bottom of section 29.

Section 31 is cylindrical and of the same thickness as seal 34. Section 32 is of frustoconical shape with a flat bottom surface 37. The upper or larger diameter of sight section 32 is slightly less than the diameter of section 31, and the smaller diameter (diameter of surface 37) is about equal to that of space 26. The top of section 32 is a little above the top of passage 15 and the bottom of section 32 is somewhat below the upper level of passage 15 and at about the same level as clip 23.

A cylindrical inner wall 38 extends upwardly within body section 16, surrounding and spaced outwardly from section 28 of the sight glass. An annular seal 39 is disposed between the sight glass and section 16, engaging tapered section 28 of the slight glass and cylindrical wall 38. The upper end of seal 39 is wider than the lower end and is held against upward movement by a ring 41 threadably mounted in an internally threaded portion 42 of section 16. A protective cap 43 with a liner 44 is mounted on an externally threaded portion 45 of section 16.

In molding sight glass 27, the parting line (indicated in dot-dash lines at 46 in FIGURE 3) may be at or close to surface 36. That is, it will be spaced a substantial distance from both sealing section 28 and sight section 32. Thus, it will not interfere in any way with the optical preciseness of surface 32, nor will it interfere with the smoothness of surface 28 which is necessary for proper sealing action.

In assembling unit 12, tightening of ring 41 will force seal 39 downwardly, and because of the slight taper of section 28, a wedging action will ensue, allowing the packing to form itself properly into sealing relation with respect to the sight glass and body. Squashing or upsetting of seal 39, which might detract from its sealing action, will thus be avoided. Shoulder 36 of sight glass 27 will, at the same time, be forced down against gasket 34 because of the presence of the intermediate ledge, indicated at 47.

In operation, the sight portion 32 of sight glass 27 will have two main functions. Through central surface 37 one will be able to see clearly at all times the liquid flowing through passage 15. This is because surfaces 36 and 37 are parallel to each other. Thus, even if there is not sufficient fluid in the circuit to fill passage 15, the liquid itself will still be clearly visible. However, the area of surface 37 will appear hazy as long as the liquid is not above the level of surface 37. Thus, the legends on papers 21 and 22 as well as their colors will be indistinct.

When the fluid in passage 15 rises above the level of surface 37 and papers 21 and 22, it will fill the space around frustoconical surface 32. The legend and colors on papers 21 and 22 will then be clearly visible through the sight glass. This is because the index of refraction of the sight glass relative to that of the liquid is such that light rays transmitted from the legends on subassembly 18 will permit the legend to be read from the outside.

It should be observed that because the frustoconical surface of section 32 surrounds circular area 37, a relatively large total area will be available for viewing the legends.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a liquid indicator of the type having an elongated body with a main passage for connection in a liquid circuit, an upward lateral apertured portion in said body having an intermediate annular shoulder, an annular indicia-carrying member mounted in the lower portion of the opening in said apertured portion, and a sight glass in said opening above said indicia-carrying member comprising a circular molded glass member having an upper sealing section, and a lower frustoconical sight section spaced from said indicia-carrrying member, said two sections having different diameters so that a mounting shoulder is formed between said sections facing the shoulder in the apertured portion of said body, the upper and lower surfaces of said sight glass being flat and parallel, the lower surface being substantially coextensive with the opening in said annular indicia-carrying member, the inclined portion of said frustoconical sight section overlying said annular indicia-carrying member whereby liquid in said body may be seen through the area defined by the narrow end of said frustoconical surface and through the opening in said annular indicia-carrying member.

2. The combination according to claim 1, the parting line of said molded sight glass being disposed between said sealing and sight sections.

3. The combination according to claim 1, further provided with a lateral extension on said body surrounding said lateral apertured portion, said extension having a wall surrounding the sealing section of said sight glass, an annnular seal between said sight glass sealing section and said wall, a slightly tapered surface on said sealing section engageable with said seal, and means for forcing said seal downwardly whereby it will be wedged between said sight glass sealing section and said surrounding wall.

4. The combination according to claim 2, as said sight glass further being provided with a cylindrical surface between said mounting shoulder and said sealing section, said parting line being located on said cylindrical surface.

5. The combination according to claim 1, said mounting shoulder comprising an annular radially extending surface, a gasket between said body shoulder and mounting shoulder and an indicator clip subassembly comprising a saddle mounted on said body adjacent said gasket and extending through the lateral opening of said apertured portion into the main passage of said body, said indicia-carrying member being on said subassembly.

References Cited
UNITED STATES PATENTS

| | | | |
|---|---|---|---|
| 2,351,100 | 6/1944 | Brelsford | 73—331 |
| 2,811,128 | 10/1957 | Franck | 116—117 |
| 2,844,026 | 7/1958 | Wischmeyer et al. | 116—117 |
| 3,000,345 | 9/1961 | Gray et al. | 73—323 |
| 3,088,811 | 5/1963 | Jones | 23—253 |
| 3,100,691 | 8/1963 | Jones | 23—253 |
| 3,122,124 | 2/1964 | Yocum | 116—117 |
| 3,142,287 | 7/1964 | Jones | 116—117 |

FOREIGN PATENTS 556,220  11/1923  France.

LOUIS J. CAPOZI, *Primary Examiner.*